(12) United States Patent
Radichel et al.

(10) Patent No.: US 11,255,479 B2
(45) Date of Patent: Feb. 22, 2022

(54) SYSTEM AND METHOD OF MAPPING A DUCT

(71) Applicant: Condux International, Inc., Mankato, MN (US)

(72) Inventors: Bradley P. Radichel, Edina, MN (US); Joshua J. Siebert, Lake Crystal, MN (US); David J. Stockton, Woodbrige (GB); Eric L. Cope, Mankato, MN (US)

(73) Assignee: Condux International, Inc., Mankato, MN (US)

( * ) Notice: Subject to any disclaimer, the term of this patent is extended or adjusted under 35 U.S.C. 154(b) by 121 days.

(21) Appl. No.: 15/570,597

(22) PCT Filed: Apr. 28, 2016

(86) PCT No.: PCT/US2016/029816
§ 371 (c)(1),
(2) Date: Oct. 30, 2017

(87) PCT Pub. No.: WO2016/176467
PCT Pub. Date: Nov. 3, 2016

(65) Prior Publication Data
US 2018/0283595 A1 Oct. 4, 2018

Related U.S. Application Data

(60) Provisional application No. 62/154,470, filed on Apr. 29, 2015.

(51) Int. Cl.
*F16L 55/48* (2006.01)
*G02B 6/50* (2006.01)
(Continued)

(52) U.S. Cl.
CPC ............... *F16L 55/48* (2013.01); *G02B 6/50* (2013.01); *F16L 2101/30* (2013.01); *G02B 6/52* (2013.01)

(58) Field of Classification Search
CPC ........ F16L 55/48; F16L 2101/30; G02B 6/50; G02B 6/52
See application file for complete search history.

(56) References Cited

U.S. PATENT DOCUMENTS 3,862,497 A 1/1975 Vernooy et al.
3,973,441 A 8/1976 Porter
(Continued)

FOREIGN PATENT DOCUMENTS

DE 10106614 C1 5/2002
DE 202015004691 U1 7/2015
(Continued)

OTHER PUBLICATIONS

International Search Report and Written Opinion for PCT/US2016/29816, dated Aug. 12, 2016.
(Continued)

*Primary Examiner* — Regis J Betsch
*Assistant Examiner* — Jeremy A Delozier
(74) *Attorney, Agent, or Firm* — Merchant & Gould P.C.

(57) ABSTRACT

A unit that houses tracking electronics configured to be passed through a duct while the tracking electronics collect position information is provided. The information collected by the unit is used to map the duct. A method of mapping a duct is also provided.

20 Claims, 1 Drawing Sheet

(51) Int. Cl.
 *F16L 101/30* (2006.01)
 *G02B 6/52* (2006.01)

(56) References Cited

U.S. PATENT DOCUMENTS

| | | | |
|---|---|---|---|
| 4,305,537 | A | 12/1981 | Samokovliiski et al. |
| 4,372,161 | A | 2/1983 | de Buda et al. |
| 4,495,808 | A | 1/1985 | Fischer, III |
| 4,541,278 | A | 9/1985 | Marsh et al. |
| 4,747,317 | A | 5/1988 | Lara |
| 4,835,876 | A | 6/1989 | Petermann et al. |
| 4,856,760 | A | 8/1989 | Frost et al. |
| 4,959,810 | A | 9/1990 | Darbee et al. |
| 5,390,841 | A | 2/1995 | Horiuchi et al. |
| 5,485,148 | A | 1/1996 | Tseng |
| 5,551,545 | A | 9/1996 | Gelfman |
| 5,675,251 | A | 10/1997 | McLean et al. |
| 5,813,658 | A | 9/1998 | Kaminski et al. |
| 5,906,357 | A | 5/1999 | Munson, Sr. |
| 6,012,621 | A * | 1/2000 | Hoium ............... G02B 6/4463 226/172 |
| 6,059,264 | A | 5/2000 | Kaminski et al. |
| 6,264,171 | B1 | 7/2001 | Hoium et al. |
| 6,364,290 | B1 | 4/2002 | Barker |
| 6,540,208 | B1 | 4/2003 | Pecot et al. |
| 6,746,000 | B2 | 6/2004 | Watanabe et al. |
| 6,935,425 | B2 | 8/2005 | Aronstam |
| 7,100,463 | B2 | 9/2006 | Boudreaux |
| 7,210,364 | B2 | 5/2007 | Ghorbel et al. |
| 7,317,308 | B2 | 1/2008 | Fagbayi et al. |
| 7,498,816 | B1 | 3/2009 | Olsson et al. |
| 7,562,861 | B2 | 7/2009 | Fee et al. |
| 7,594,448 | B2 | 9/2009 | Jacobson et al. |
| 7,623,961 | B2 | 11/2009 | Van Den Broeck |
| 7,841,249 | B2 | 11/2010 | Tormoen |
| 7,845,419 | B2 | 12/2010 | Naumann |
| 8,001,858 | B2 | 8/2011 | Cogen et al. |
| 8,051,524 | B2 | 11/2011 | Ferreira Lino et al. |
| 8,261,623 | B2 | 9/2012 | Miller et al. |
| 8,395,661 | B1 | 3/2013 | Olsson et al. |
| 8,491,722 | B2 | 7/2013 | Phipps |
| 8,547,428 | B1 | 10/2013 | Olsson et al. |
| 8,655,596 | B2 | 2/2014 | Ekseth et al. |
| 8,661,909 | B2 | 3/2014 | Chu et al. |
| 8,689,653 | B2 | 4/2014 | Cogen et al. |
| 8,720,030 | B2 | 5/2014 | Barker et al. |
| 8,765,061 | B2 | 7/2014 | Tunheim et al. |
| 8,775,083 | B2 | 7/2014 | Young et al. |
| 9,156,665 | B2 | 10/2015 | Yoder et al. |
| 2004/0211258 | A1 * | 10/2004 | Geen ................. G01C 19/5719 73/510 |
| 2005/0198063 | A1 | 9/2005 | Thomas et al. |
| 2006/0219992 | A1 * | 10/2006 | Fee .................... H02G 1/086 254/134.4 |
| 2006/0290779 | A1 * | 12/2006 | Reverte ................. E03F 7/10 348/84 |
| 2007/0269269 | A1 | 11/2007 | Coronado et al. |
| 2008/0012720 | A1 | 1/2008 | Rostron |
| 2009/0188059 | A1 | 7/2009 | Albrecht et al. |
| 2010/0236811 | A1 | 9/2010 | Sasse et al. |
| 2010/0296519 | A1 | 11/2010 | Jones |
| 2011/0125462 | A1 * | 5/2011 | Petrosky ............. F22B 37/003 702/188 |
| 2011/0239222 | A1 | 9/2011 | Wu |
| 2012/0061633 | A1 | 3/2012 | Holley |
| 2012/0118085 | A1 | 5/2012 | Christie |
| 2012/0168699 | A1 | 7/2012 | Rachminov et al. |
| 2012/0257042 | A1 * | 10/2012 | McKaigue ........... G01N 21/954 348/84 |
| 2013/0030704 | A1 * | 1/2013 | Young .................. G01V 1/00 702/5 |
| 2013/0200055 | A1 | 8/2013 | Enyedy et al. |
| 2013/0256613 | A1 | 10/2013 | Hyde et al. |
| 2014/0013872 | A1 | 1/2014 | Thursby |
| 2014/0209126 | A1 | 7/2014 | Doig |
| 2016/0159509 | A1 | 6/2016 | Lewis et al. |

FOREIGN PATENT DOCUMENTS

| | | |
|---|---|---|
| EP | 0911452 A2 | 4/1999 |
| FR | 2577724 A1 | 8/1986 |
| GB | 1508261 A | 4/1978 |
| GB | 2088554 A | 6/1982 |
| JP | 2012-173086 A | 9/2012 |
| WO | 92/09847 A1 | 6/1992 |
| WO | 2006103419 A1 | 10/2006 |
| WO | 2012/165824 A2 | 12/2012 |
| WO | 2013/169200 A1 | 11/2013 |
| WO | 2016/176467 A1 | 11/2016 |

OTHER PUBLICATIONS

International Search Report and Written Opinion for PCT/US2017/061621, dated Mar. 26, 2018.

"Fiber Optic Cable Blowing", product manual, Condux International, Inc., accessed on Apr. 25, 2016.

European Patent Office; Communication with European Search Report for Application No. 17869560.7 dated Jun. 8, 2020, 8 pages.

* cited by examiner

SYSTEM AND METHOD OF MAPPING A DUCT

This application is a National Stage application of PCT International Patent application No. PCT/2016/029816, filed Apr. 28, 2016, which claims priority to U.S. Provisional patent application Ser. No. 61/154,470, filed Apr. 29, 2015, which applications are hereby incorporated by reference. To the extent appropriate, a claim of priority is made to each of the above disclosed applications.

TECHNICAL FIELD

A system and method for mapping a duct involving blowing a data recording unit through a duct and collecting data from the unit to map the duct.

BACKGROUND

Ducts, conduits and pipes, which are terms used herein interchangeably, are often preinstalled in areas that are difficult to access (underground, crawl spaces, in walls, etc.). It is often desirable to know the path of the ducts including the length of the ducts, what bends exist, and the degree and direction of each of the bends. This is because the length and complexity of the route (bends and inclines) affects the distance that a cable can be installed into that duct. This is the case irrespective of whether the cable is to be installed by any of the well-known techniques including fluid propulsion (gas or liquid), pushing or pulling. In the situation described below, the common technique of air-blowing is referred to but the principles can be extended to the other techniques listed above.

For example, prior to installing fiber optic cables into a duct, it is desirable to map the duct to determine how best to install the cable. If the duct is generally straight, it may be possible to install the fiber optic cable all in one shot. However, if the duct takes a twisted path, it might need to be installed in two or more blowing steps. Without the benefit of duct mapping the fiber optic cable installer would need to guess at the best location from which to blow the cable and guess how many steps may be required. If the operator over-estimates the ability to blow the cable, the cable can become stuck at an inconvenient location (e.g., in a duct buried in a cement wall, in a duct deep under a road) requiring retracting the cable and reinstalling it from another location, or worse excavating at the inconvenient location to free the cable. This trial and error process is time consuming and inefficient. On the other hand, if the operator underestimates the ability to blow the cable and chooses to blow the cable in multiple stages, this may also be inefficient. In situations where the duct is generally level and straight with only gradual curves, it may be possible to install the cable in fewer steps than would be expected. Accordingly, accurate mapping of the duct can improve the installation of cable within the duct. Many other advantages of duct mapping exist for example the possibility to overlay the recorded data onto a Geographic Information System (GIS) to provide a real world ('as built') record of the cable and duct deployment. In addition it may be possible to download the routing information onto an electronic interface for controlling the installation process.

SUMMARY

The present disclosure provides a unit that contains tracking electronics. The unit is configured to be passed through the duct while the tracking electronics collects position information. The information collected by the unit can be used to map the duct. A method of mapping a duct is also provided.

DETAILED DESCRIPTION

Figure 1:
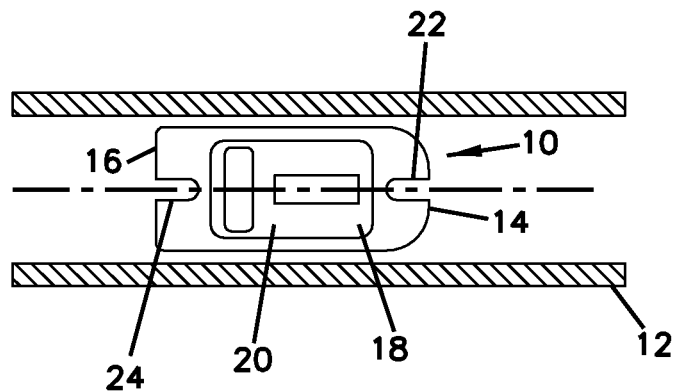
FIG. 1 is a side elevation view of a unit according to the present disclosure in a straight duct.
Figure 2:
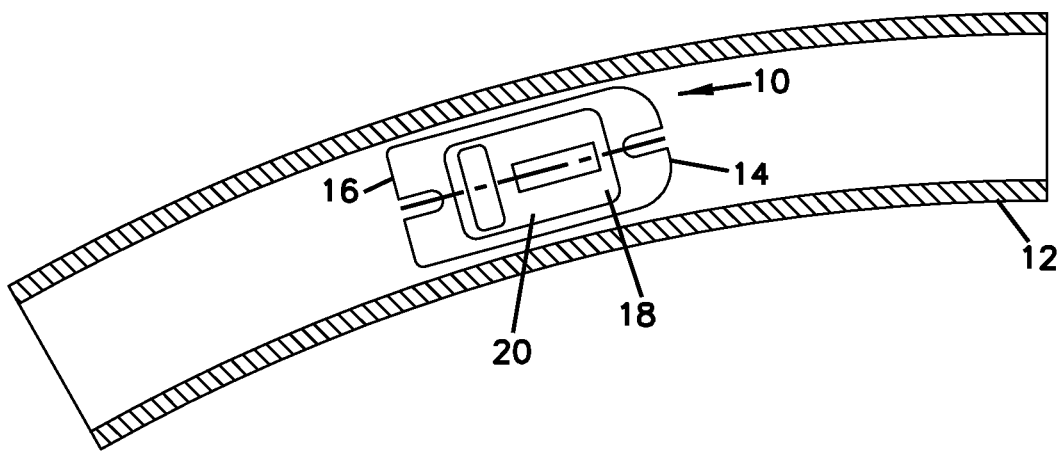
FIG. 2 is a side elevation view of the unit of FIG. 1 in a curved duct.

Referring to the FIGS., systems for mapping a duct according to the present disclosure are described herein in further detail. In the depicted embodiment the system includes a unit 10 configured to be passed through a duct 12. The unit 10 includes a body portion having a first end portion 14 and a second end portion 16. The body portion defines an internal cavity 18 configured to house electrical components 20 therein. In the depicted embodiment, the first end portion 14 includes a rounded leading surface and the second end portion 16 defines a trailing surface. A device configured to drive the unit 10 through a duct 12, for example, a blower. The system can also include a processor configured to receive information collected by the unit 10 as the unit travels through the duct 12 to map the duct 12.

In the depicted embodiment, the electrical components include a battery, a six degree of freedom microprocessor chip, as well as memory and communication electronics. The 6 degree of freedom feature is useful in that it provides 3-axis acceleration, 3-axis angular rate and brain functions. In the depicted embodiment, the electrical components are connected together to form a modular electrical unit. The modular electrical unit is configured to be removed from one unit and placed into another unit. The system can include multiple units of various sizes, each of the units configured to receive the modular electrical unit. The selection of the proper unit for a particular application can depend on the type and size of the duct. It should be appreciated that many other types of electrical components can be carried by the unit. For example, the electrical components could also include a toxic material sensor, magnetic field detector, pressure sensor, moisture sensor, or infrared scanner.

As discussed above, the unit 10 is configured to collect position data as it moves through the duct. In some embodiments the unit 10 is configured to transmit data so that it can be tracked as it moves through the duct. In addition to collecting position data, unit 10 can be configured to clean the duct as it moves through the duct 12, or alternatively to transfer lubricant to the duct surface. In the depicted embodiment, the unit 10 is configured to be connected with other units. The each units can be configured for their own functions (e.g., one unit could be for cleaning, another for detecting moisture, another for tracking position). In the depicted embodiment, the first end portion 14 includes a pulling eye 22 configured to connect to a duct pull cord and/or to connect to another unit, and the second end portion 16 includes an inboard link 24 configured to connect to another unit. In the depicted embodiment, the unit has an overall length of less than ten millimeters, which enables the unit to move efficiently through ducts with bends. For example, a unit having an outer diameter of between four and five millimeters (about 4.5 mm) can be blown through a 5.5 mm inner diameter duct with a minimum bend radius of 70 mm.

In the depicted embodiment, the system can further include a display configured to visually display the duct configuration. The unit can also include a system that provides detailed data that can be imported into blowing performance software to provide recommended flow rate, blowing pressure, and locations for blowing for example. In the depicted embodiment, the system also includes a unit trap configured to be mounted to a far end of the duct to trap the unit as it exits the duct. It should be appreciated that the system can include fewer features or more features than are described herein.

The present disclosure also provides a method for mapping a duct including selecting a unit that has a diameter that is within 5-25 percent smaller than the diameter of a duct of which the unit is configured to be blown through; inserting a modular electrical unit into the selected unit, the modular electrical unit configured to track the position of the unit; blowing the unit through the duct while the modular electrical unit collects and stores data regarding the position of the unit; and mapping the duct based on the data collected by the unit.

The method can also include providing recommended flow rate, blowing pressure, and locations for blowing based on information collected by the unit and received by the processor. In addition it can also include providing information to another software application that visually displays the mapped route.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A system for installing a cable into a duct, the system comprising:
   a duct mapping unit configured to be blown through a duct, the duct mapping unit including a body portion housing electrical components therein, the electrical components operable to collect data defining a path of a duct as the duct mapping unit travels through the duct;
   a drive device comprising a mapping system blower configured to generate pressurized fluid to blow the duct mapping unit through the duct, the drive device being separate from the duct mapping unit;
   a computing system comprising a processor that receives the collected data defining the path of the duct, wherein the computing system stores data instructions that, when executed by the processor, causes the processor to generate cable installation parameters comprising blower operational parameters based on the collected data defining the path of the duct; and
   a cable installation system comprising a cable installation blower operable to install a cable into the duct according to the cable installation parameters including the blower operation parameters.

2. The system of claim 1, wherein the mapping system blower is the cable installation blower.

3. The system of claim 1, wherein the drive device comprises a puller operable to pull the duct mapping unit using a pull cord.

4. The system of claim 1, wherein the cable installation system includes the drive device.

5. The system of claim 1, wherein the duct mapping unit comprises at least a six degree of freedom microprocessor chip.

6. The system of claim 5, wherein the at least a six degree of freedom microprocessor chip comprises electronics that detect at least 3-axis angular acceleration and 3-axis angular rate.

7. The system of claim 1, wherein the duct mapping unit comprises a rounded leading surface.

8. The system of claim 7, wherein the rounded leading surface comprises a pulling eye for connection with a pulling cord of a puller.

9. The system of claim 1, wherein the electrical components of the duct mapping unit comprise a battery.

10. The system of claim 1, wherein the electrical components of the duct mapping unit comprise memory and communication electronics.

11. The system of claim 1, wherein the electrical components of the duct mapping unit are modular and removable.

12. The system of claim 1, wherein the electrical components of the duct mapping unit comprise a magnetic field detector.

13. The system of claim 1, wherein the duct mapping unit is configured to transmit the data so that it can be tracked as it moves through the duct.

14. The system of claim 1, wherein the duct mapping unit has an overall length of less than ten millimeters.

15. The system of claim 1, wherein the duct mapping unit has an outer diameter of between four and five millimeters.

16. A method of installing a cable into a duct, the method comprising:
   using a drive device comprising a mapping system blower, generating pressurized fluid to blow a duct mapping unit through a duct, the drive device being separate from the duct mapping unit;
   using the duct mapping unit, collecting data describing a path of the duct;
   providing the data describing the path of the duct to a computing system to generate cable installation parameters based on the data describing the path of the duct;
   receiving the cable installation parameters comprising blower operational parameters at a cable installation system; and
   operating the cable installation system comprising a cable installation blower according to the cable installation parameters including the blower operational parameters to install a cable into the duct.

17. The method of claim 16, wherein the data describing the path of the duct includes a length of the duct, and data relating to degree and direction of bends in the duct.

18. The method of claim 16, wherein the cable installation parameters comprise at least one of: recommended flow rate, blowing pressure, and a location for blowing.

19. The method of claim 16, further comprising:
   selecting a housing sized to fit the duct from a plurality of housings; and
   assembling the duct mapping unit by inserting a modular electronic component into the selected housing.

20. The method of claim 16, wherein the mapping system blower is the cable installation blower.

* * * * *